United States Patent [19]

Jureit et al.

[11] 4,044,093

[45] Aug. 23, 1977

[54] FLAT CHORD TRUSS JIG ASSEMBLY

[75] Inventors: John Calvin Jureit, Coral Gables; Adolfo Castillo, Miami, both of Fla.

[73] Assignee: Automated Building Components, Inc., Miami, Fla.

[21] Appl. No.: 509,568

[22] Filed: Sept. 26, 1974

[51] Int. Cl.[2] ............................................ B23Q 3/00

[52] U.S. Cl. ............................ 269/321 F; 144/288 B

[58] Field of Search .................. 269/321 S, 321 F, 37, 269/40, 43, 228, 242, 289, 303; 29/559, 428; 144/288 R, 288 C, 309 B, 288 B; 100/DIG. 13

[56] References Cited

U.S. PATENT DOCUMENTS

| | | | |
|---|---|---|---|
| 1,642,186 | 9/1927 | Wilson | 144/309 B |
| 2,377,904 | 6/1945 | Roach | 269/43 |
| 3,329,328 | 7/1967 | Jureit et al. | 100/DIG. 13 |
| 3,390,628 | 7/1968 | Sanford | 144/228 C |
| 3,413,703 | 12/1968 | Sanford | 100/DIG. 13 |
| 3,749,391 | 7/1973 | Templin | 269/321 F |

*Primary Examiner*—Al Lawrence Smith
*Assistant Examiner*—Robert C. Watson
*Attorney, Agent, or Firm*—LeBlanc & Shur

[57] ABSTRACT

The flat chord truss jig assembly includes a jig pad carrying two pairs of laterally spaced elongated guide bars. Releasable clamps are provided along the opposite outer edges of the pad and engageable with the outermost pair of bars. The innermost pair of bars are connected by longitudinally spaced rods reverse threaded at opposite ends for threaded engagement with the bars whereby rotation of the rods moves the innermost pair of bars toward and away from one another to introduce similar camber in each innermost bar. An end locator plate is positioned between each pair of bars at opposite ends of the truss. The chords and diagonals of a flat chord truss are disposed between the pairs of bars on opposite sides of the jig pad and connector plates of the type having integrally struck teeth are prepositioned at the joints between such chords and diagonals. The jig assembly is moved through a press whereupon the teeth of the connector plates are embedded into the joints to complete a flat chord truss.

7 Claims, 25 Drawing Figures

T
W
P
C1
C2
D
W1
16
18
26
30
36
12
34
42
39
40
38
22
32
28
54
50
48
66
68
64
58
62
70
46
52
60
6

FLAT CHORD TRUSS JIG ASSEMBLY

The present invention relates to a jig assembly for use in prefabricating wooden structural members and more particularly relates to a novel and improved jig assembly for forming flat chord trusses.

With the advent of connector plates of the type having integrally struck teeth for embedment into the joints of prepositioned wooden members whereby the plate forms the sole connection between the wooden members, e.g., the connector plate described and illustrated in U.S. Pat. No. 2,877,520 of common assignee herewith, the wooden building industry has taken long strides forward in prefabricating the various wooden elements utilized in residential, institutional, office and other types of buildings. For example, it is presently common practice to prefabricate roof trusses by utilizing jig assemblies and heavy duty presses at a fabrication site for pressing the teeth of connector plates into the joints of wooden members prepositioned on jig assemblies to form a roof truss. Various equipment has been developed to effectively locate the members of the truss and maintain the same in such prepositioned locations while the teeth of the connector plates are embedded into the joints of the truss. An example of such jig assembly is described and illustrated in U.S. Pat. No. 3,238,867 of common assignee herewith. In such jig assemblies, longitudinally and transversely extending guide bars are positioned on a jig pad in accordance with the desired configuration of the truss undergoing fabrication and the elements of the truss are located along stops and against abutments carried by the guide bars. Various clamps are carried by reaction pads mounted on the guide bars and such clamps hold the elements in proper position on the jig pad. Connector plates are spotted on opposite sides of the elements and the jig assembly is either moved through a press or a press is moved relative to the jig assembly to embed the teeth of the connector plates into opposite sides of the joints to form a roof truss.

In recent years and particularly with the onset of a shortage in lumber and other materials, it has been found desirable, in certain applications, to substitute flat chord trusses for conventional floor joists. A flat chord truss comprises a pair of chords between which are disposed diagonals and verticals, all members of the truss having their flat sides, i.e., the sides of greatest width, extending in planes normal to the plane of the truss. It will be appreciated that the diagonals of such a flat chord truss can be formed of what otherwise would constitute scrap lumber, thus conserving supplies of lumber. For example, a flat chord truss can be formed of 2 × 4's with the upper and lower chords lying flat on their four inch nominal sides with the diagonals extending between the chords with their long four inch sides extending similarly as the long sides of the chords. Connector plates of the type having integrally struck teeth are applied to the joints along opposite sides of the truss and the flat chord truss is ready for use, for example as a floor joist.

In utilizing a flat chord truss, it is desirable to provide an initial camber in the truss such that when the truss is loaded it will extend substantially linearly. That is, a flat chord truss having upper and lower chords in the form of a shallow parabolic curve is ideal such that when the truss is in position supported at its ends with the chords curving slightly upwardly, the applied loading will tend to straighten the truss into a linear configuration. The jig assemblies utilized previously in forming roof trusses, such as disclosed in the aforementioned U.S. Pat. No. 3,238,867, cannot be utilized to form a flat chord truss due to the difference in configuration of a flat chord truss and a roof truss and also due to the desirability to impart a camber to the flat chord truss.

The present invention therefore provides a novel and improved jig assembly particularly useful for forming flat chord trusses. Particularly, the present invention provides a jig assembly comprised of a jig pad carrying two pairs of elongated guide bars disposed along opposite sides of the pad. Along opposite edges of the pad are a plurality of longitudinally spaced releasable clamps engageable with the outermost bar of each pair thereof. The ends of the inner pair of guide bars are secured one to the other by transversely extending bars, in turn, secured to the pad whereby the opposite ends of the inner pair of bars are anchored to the jig pad. An end stop assembly is provided between the pair of bars on the opposite sides of the jig assembly to provide an end abutment for the chords. The end stop includes an element movable longitudinally into adjusted positions such that one of the chords can be inset relative to or set outwardly from the end of the other chord. Also, the end stop is adjustable transversely whereby its width can be adjusted depending upon the width of the flat chord truss undergoing fabrication. The innermost pair of bars are connected one to the other at longitudinally spaced positions therealong by a plurality of rods which are reversely threaded at opposite ends for threaded engagement with the respective bars. Consequently, with the opposite ends of the innermost pair of bars anchored, it will be appreciated that threading or unthreading action of the rods moves the innermost pair of bars toward or away from one another respectively whereby a camber is introduced into the innermost guide bars. This threading or unthreading action is performed selectively with respect to the various rods and certain rods are usually rotated to a greater or lesser extent than others to obtain a smooth shallow parabolic curve. The outermost pair of bars are likewise bent to a like camber by prepositioning the clamps along the jig pad.

With the foregoing described arrangement, the upper and lower chords of the pair of flat chord trusses undergoing simultaneous fabrication are inserted between the pairs of bars along opposite sides of the jig assembly. The verticals are positioned at opposed ends of the chords against the end stops and a pair of vertical elements are disposed substantially normal to the chords of the truss substantially medially of the truss. The diagonals, which are precut, are then located between the chords starting at opposite ends of the trusses and working toward the middle of the truss. A clamp is then disposed between the middle vertical elements and expanded to tension the diagonals rigidly one against the other and against the chords whereby the chords follow the camber of the guide bars. Connector plates of the type having integrally struck teeth are thereafter spotted along the truss to overlie the joint between the diagonals and the chords. The pair of flat chords are thus prepositioned on the jig assembly ready for movement through a press whereupon the teeth of the connector plates are embedded into the joints formed by the diagonals, verticals and the chords to form the flat chord truss.

Accordingly, it is a primary object of the present invention to provide a novel and improved jig assembly for forming wooden trusses.

It is another object of the present invention to provide a novel and improved jig assembly for forming flat chord trusses.

It is still another object of the present invention to provide a novel and improved jig assembly for forming trusses having a camber.

It is a further object of the present invention to provide a novel and improved jig assembly for forming flat chord trusses wherein a pair of trusses are simultaneously fabricated on a single jig pad.

It is a still further object of the present invention to provide a novel and improved jig assembly for fabricating flat chord trusses wherein guide bars for the pair of trusses formed on each jig pad are provided with means for introducing a like camber into each of the trusses undergoing fabrication.

It is a related object of the present invention to provide a novel and improved jig assembly having the foregoing characteristics and wherein end stops are provided on the pad assembly and which stops are adjustable to enable formation of the truss with one of its chords inset or outwardly beyond the other chord or a truss having the ends of the chords flush one with the other.

It is a related object of the present invention to provide a novel and improved method of fabricating a wooden truss and particularly a flat chord truss.

These and further objects and advantages of the present invention will become more apparent upon reference to the following specification, appended claims and drawings wherein:

Figure 13:
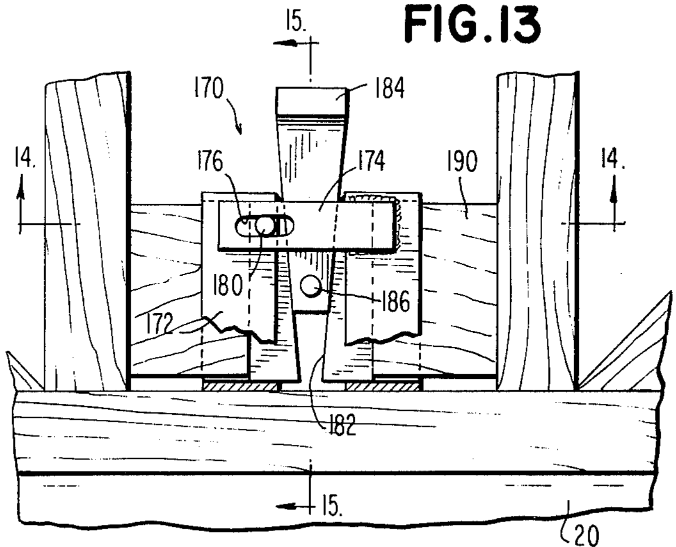
FIG. 13 is an enlarged fragmentary plan view of a portion of the truss illustrating the use of a web or diagonal alignment device.
Figure 15:
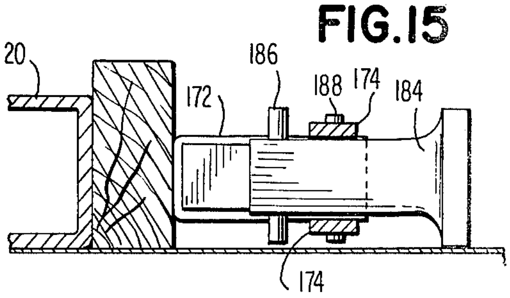
Figure 14:
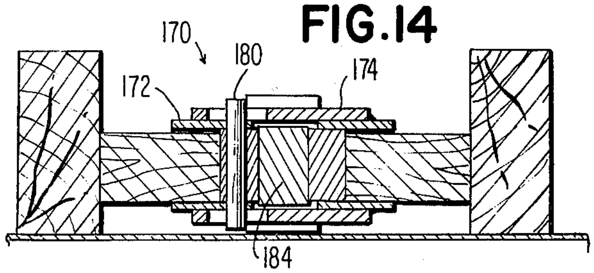
Figure 16:
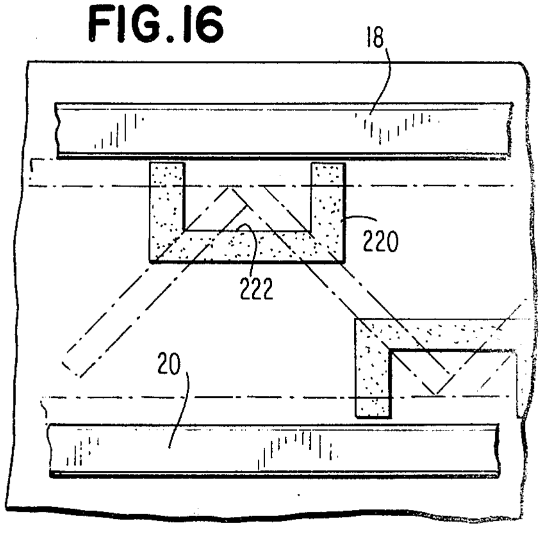
Figure 18:
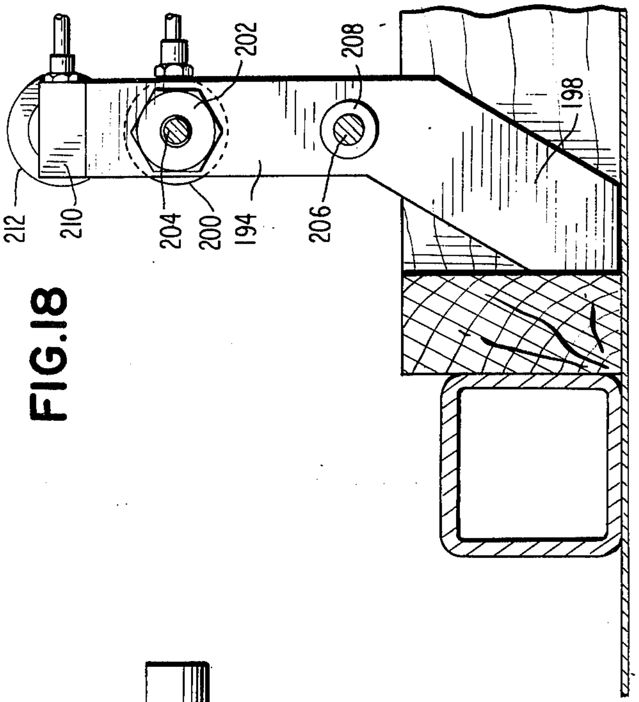
Figure 17:
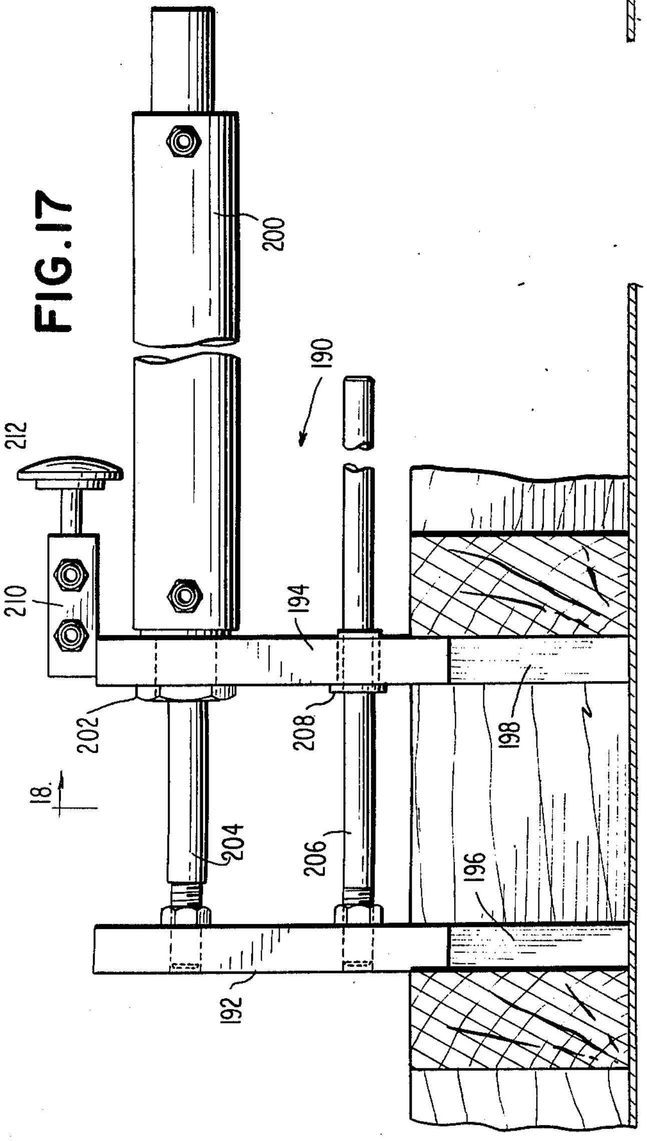
Figure 19:
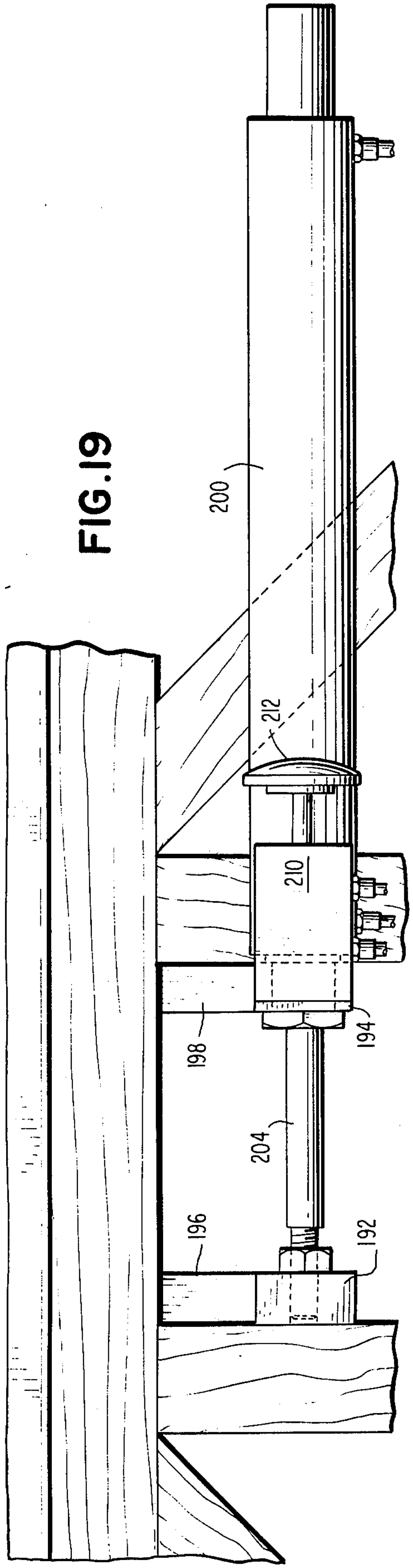
Figure 20:
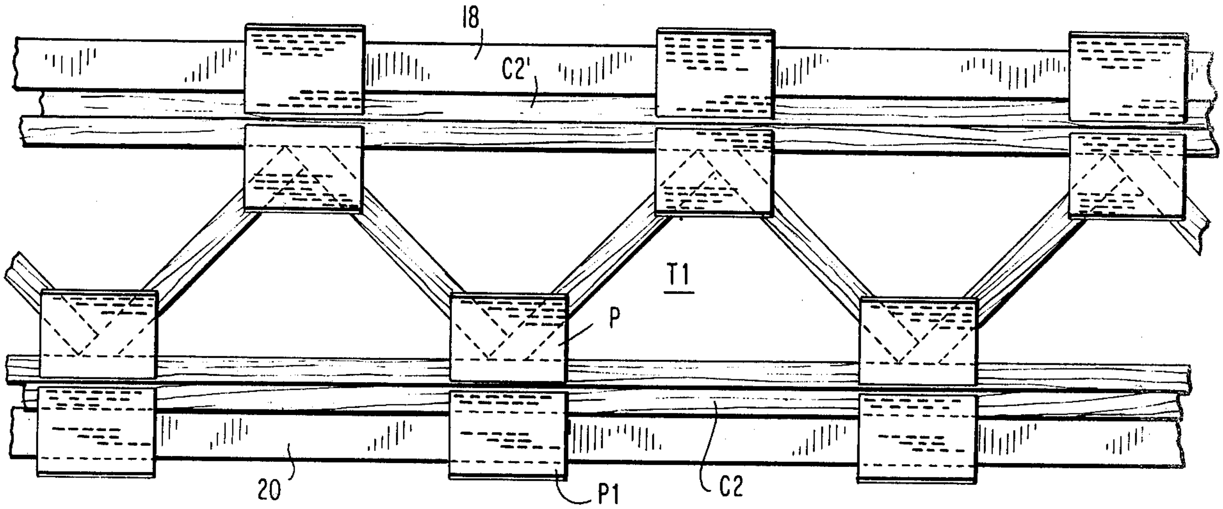
Figure 21A:
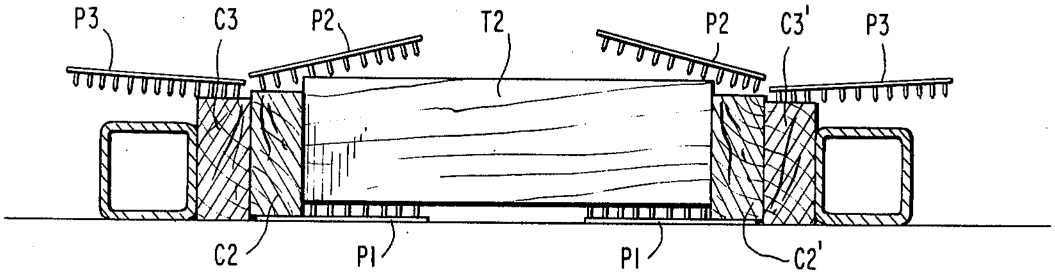
Figure 21B:
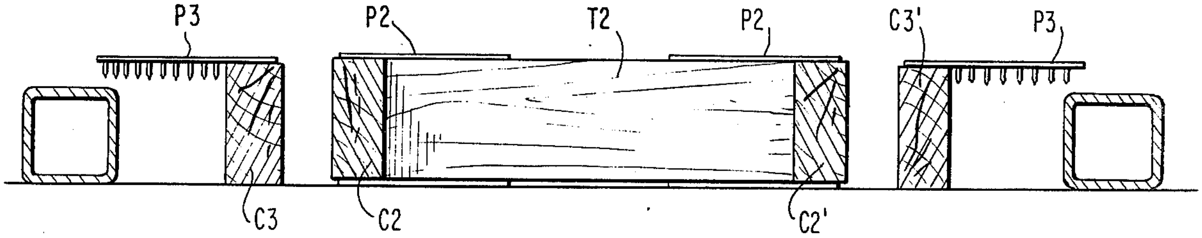
Figure 21C:
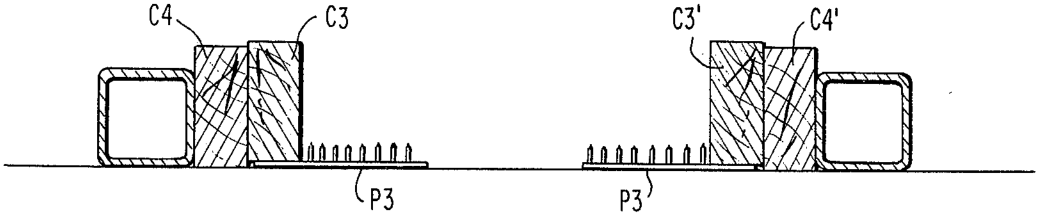

FIGS. 14 and 15 are respective fragmentary cross-sectional views thereof taken about on lines 14—14 and 15—15 in FIG. 13;

FIG. 16 is a fragmentary schematic illustration of a further form of flat chord jig assembly constructed in accordance with the present invention;

FIG. 17 is an enlarged side elevational view of another form of web alignment device utilized in the jig assembly hereof;

FIG. 18 is a cross-sectional view thereof taken generally about on line 18—18 in FIG. 17;

FIG. 19 is a plan view of the alignment device illustrated in FIG. 17;

FIG. 20 is a fragmentary plan view of a portion of the jig assembly hereof illustrating the application of connector plates to the truss undergoing fabrication and to the chords of the next truss to be fabricated; and FIGS. 21A, 21B and 21C are enlarged cross-sectional views of the truss and guide bars illustrated in FIG. 20 and illustrating the manner in which the trusses are formed.

Figures 3, 4, 5, 6:
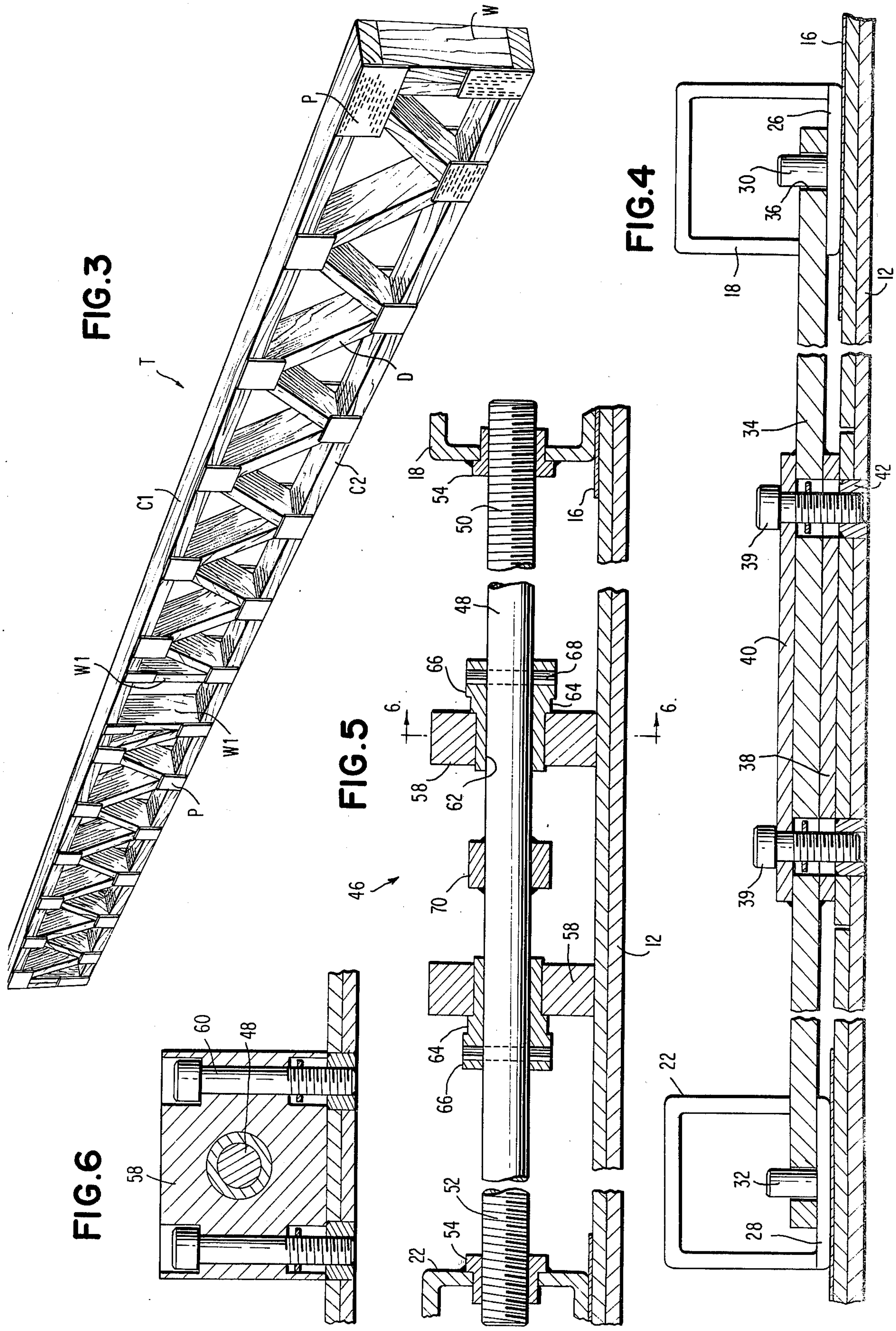
FIG. 3 is a perspective view of a completed flat chord truss constructed utilizing the jig assembly hereof.
FIG. 4 is an enlarged cross-sectional view taken about on line 4—4 in FIG. 1, and particularly illustrating the adjustable end anchorage for the inner pair of guide bars.
FIG. 5 is an enlarged fragmentary cross-sectional view thereof with parts broken out taken generally about on line 5—5 in FIG. 1.
FIG. 6 is an enlarged fragmentary cross-sectional view taken generally about on line 6—6 in FIG. 5.

Referring now to the drawings and particularly to FIG. 3, there is illustrated a flat chord truss generally designated T comprised of upper and lower chords C1 and C2 respectively interconnected by diagonals D and end webs W. For reasons which will become apparent from the ensuing description, a pair of intermediate webs W1 are spaced one from the other approximately adjacent a medial portion of truss T. The joints of the truss, i.e., the joints formed between the diagonals and the chords; between the diagonals, webs and chords; and betweeen the webs and chords as applicable, are formed by embedding the teeth of connector plates T into the opposite sides of such joints as they occur throughout the length of the truss. The connector plates P may be of the type disclosed in U.S. Pat. No. 2,877,520 of common assignee herewith. It will be appreciated from a review of FIG. 3 that the flat chord truss T is comprised of truss elements which are greater in width in planes normal to the plane of the truss. For example, the truss may be formed of elongated chords formed from 2 × 4's with the 2 × 4's placed on their sides. The diagonals D may be formed likewise of 2 × 4 scrap material cut to suitable length and preferably bevelled at their ends and interposed between the chords in the manner illustrated. The webs likewise may be cut from scrap 2 × 4's and interposed substantially normally between the chords, the webs and diagonals having their larger width extending transversely of the plane of the chord.

Figure 1:
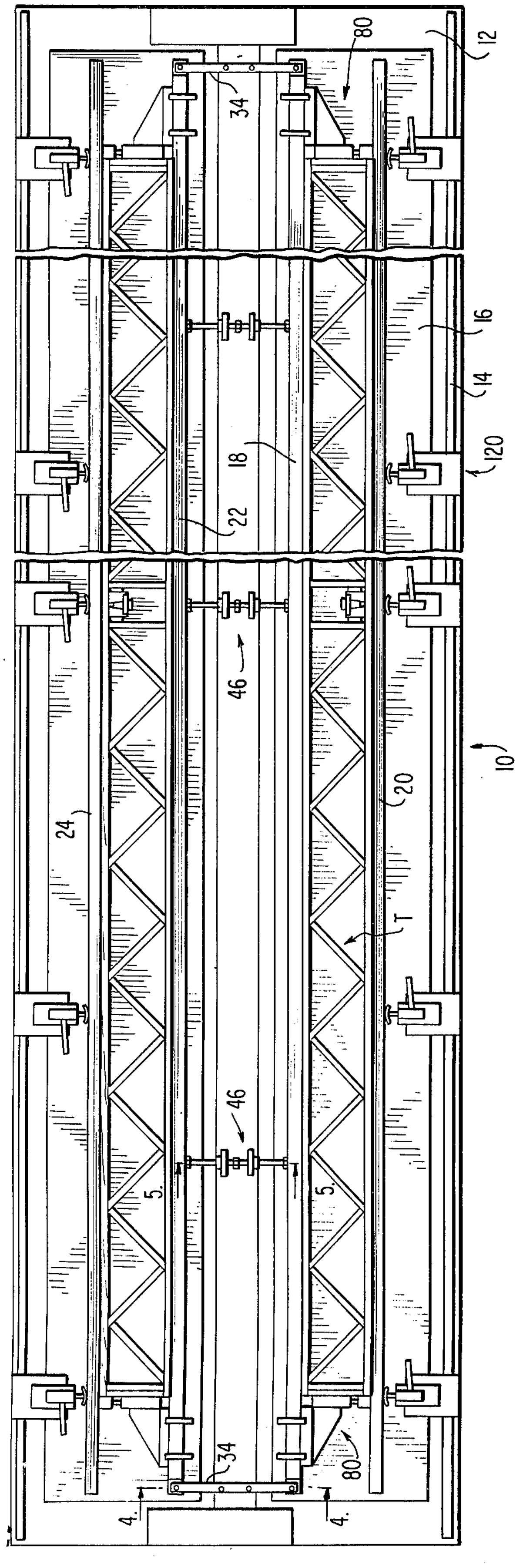
FIG. 1 is a plan view of a flat chord truss jig assembly constructed in accordance with the present invention and illustrated with parts broken out.

Referring now to FIG. 1, there is illustrated a jig assembly generally designated 10 for forming one or a pair of the aforedescribed flat chord trusses T and which jig assembly includes a jig pad or pallet 12 formed of a large heavy sheet of metal or of a thin sheet of metal suitably reinforced or of any other suitable structural material upon which the elements of the jig assemly may be mounted. Carried along opposite long edges of the jig pad 12 are elongated guides 14 for mounting the clamp assemblies described hereinafter. A pair of elongated light sheet metal plates 16 are disposed along opposite sides of jig pad 12 and inwardly of mounting guides 14 and which plates 16 provide a smooth surface on which the jig and truss elements are disposed during fabrication.

A pair of elongated guide bars are utilized in the fabrication of each truss T. As illustrated in FIG. 1, a pair of such guide bars 18 and 20 are spaced one from the other and extend longitudinally along one side of the jig pad 12, while another pair of guide bars 22 and 24 extend longitudinally adjacent the opposite side of the jig pad 12. Bars 18 and 22 constitute an inner pair or inboard pair of bars while bars 20 and 24 constitute outboard or outermost pair of bars. Such bars are formed preferably from square structural steel tubing. With particular attention directed to FIGS. 1, 2, and 4, the innermost pair of bars 18 and 22 are secured one to the other at their opposite ends against transverse movement toward and away from one another by like end securement assemblies but which assemblies permit limited longitudinal movement of the bars relative to the end anchorages therefor whereby camber can be provided guide bars 18 and 22 in the manner set forth hereinafter. Particularly, the ends of the guide bars 18 and 22 are axially inset along their upper sides, leaving end projecting flanges 26, 28 on which are mounted upstanding pins 30 and 32 respectively. At each end of the guide bars 18 and 22, an end bar 34 having slots 36 in its opposite ends rigidly secures tubes 18 and 22 against relative transverse movement, the pins 30 and 32 being received in the slots 36 at the opposite ends of the bar 34 with bar 34 overlying flanges 26 and 28. Slots 36 are elongated in a direction generally parallel to bars 18 and 22 whereby the bars 18 and 22 are free for limited axial sliding movement relative to end bars 34 which are secured to jig pad 12 in the manner which will now be set forth. A spacer plate 38 is interposed between jig pad 12 and end bar 34 and a plate 40 overlies a central portion of bar 34. Bar 34 and spacer plate 38 are suitably apertured to receive bolts 39 extending through plate 40 and into adapters 42. Bolts 39 are threaded into the adapters 42 provided in the underlying jig pad 12. At each end of the jig pad, plate 40 is welded to end bar 34 and end bar 34 in turn is welded to the spacer plate 38, whereby the ends of guide bars 18 and 22 adjacent opposite ends of the jig pads are accurately located transversely relative to one another.

Intermediate the opposite ends of guide bars 18 and 22 and at longitudinally spaced position along jig pad 12, there are provided a plurality of camber adjustment assemblies generally designated 46. As best illustrated in FIG. 5, each such camber adjustment assembly 46 includes a camber adjustment rod 48 which is reversely threaded at opposite ends at 50 and 52 respectively. Reversely threaded adapters 54 are secured inside openings of each of the tubes 18 and 22 and threadedly engage respective opposite ends of rod 48. As best illustrated in FIG. 6, a pair of center plates 58 are secured to jig pad 12 by means of bolts 60. The center plates 58 are spaced transversely one from the other near to but on opposite sides of the longitudinal centerline of jig pad 12 and each are provided with openings 62 which receive collars 64. Each collar 64 has an enlarged diameter portion 66 which extends outwardly of center plate 58 on the like side thereof as the side of pad 12 carrying plate 58.

Each collar 64 includes a pin 68 which extends through rod 48 whereby collars 64 and rod 48 are rotatable relative to centerplates 58. A hex nut 70 is secured to rod 48 intermediately of center plate 58 to facilitate rotation of rod 48, for example by a wrench.

It will be appreciated that rotation of rod 48 in opposite directions causes tubes 18 and 22 to move toward and away from one another respectively. Consequently, camber is introduced into tubes 18 and 22 by adjustably rotating the various rods 48 to a greater or lesser extent depending upon the longitudinal locations of the camber adjustment assemblies along pad 12 and the desired extent of the camber at each such location. For example, to impart a smooth camber curve, the median camber adjustment assembly is rotated to displace the center portions of tubes 18 and 22 toward one another the maximum distance desired to introduce camber into the medial portion of the truss while the rods of the adjustment assemblies to either side thereof would be rotated lesser amounts, it being appreciated that the ends of inner tubes 18 and 22 are anchored by the end bar assemblies previously described.

Figure 7:
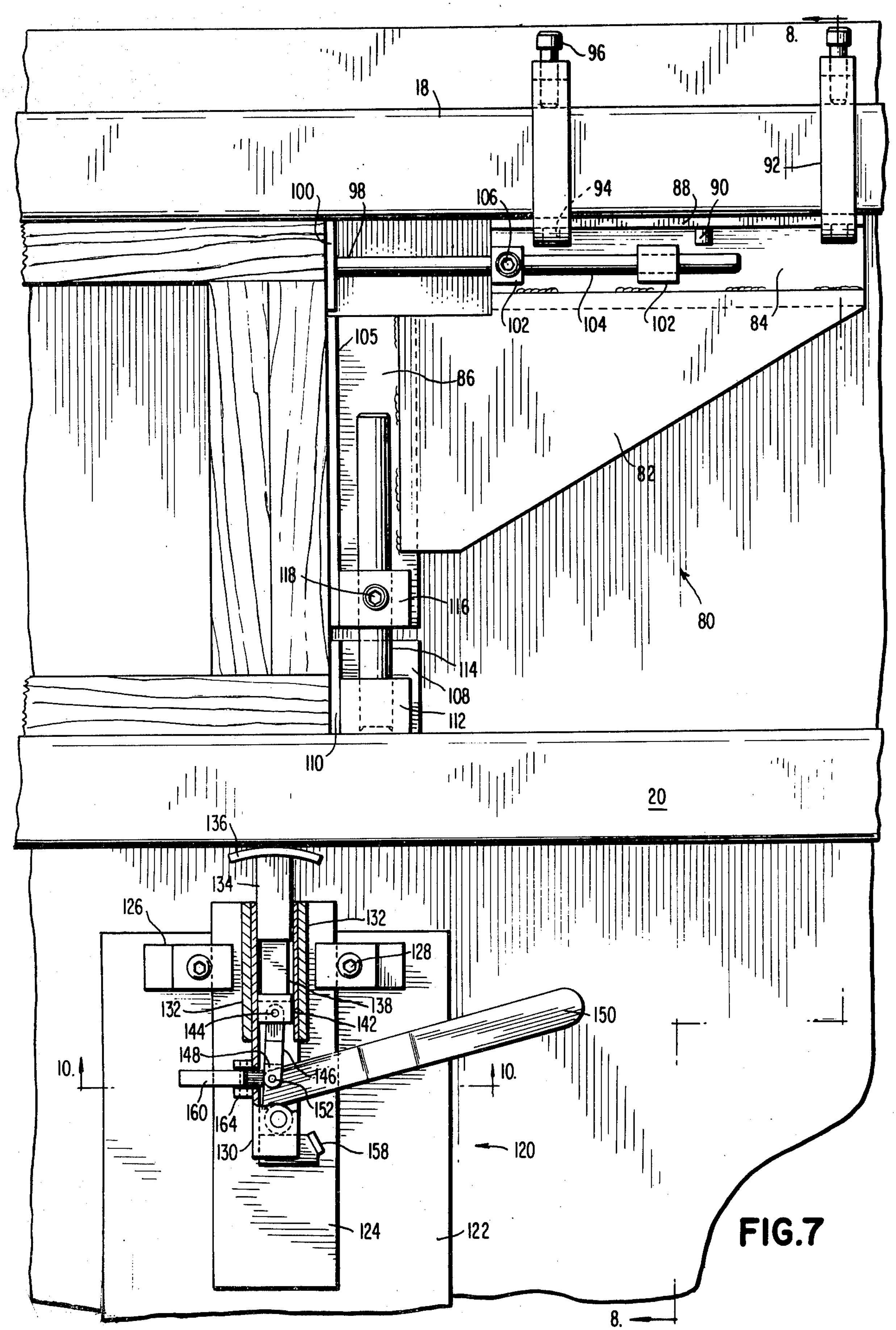
FIG. 7 is an enlarged fragmentary plan view of one end and a side of the jig assembly particularly illustrating an adjustable clamp and end locator or stop assembly therefor.
Figure 8:
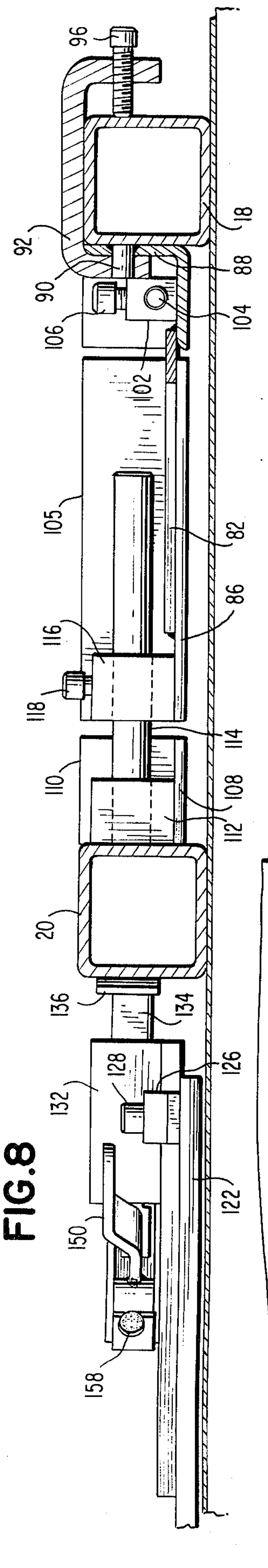
FIG. 8 is a cross-sectional view thereof taken generally about on line 8—8 in FIG. 7.

Located between each pair of bars along opposite sides of jig pad 12 and adjacent its opposite ends is an end locator or stop assembly generally designated 80. The end locator assemblies 80 at opposite ends of each pair of guide bars, for example, bars 18 and 20 are reversed one from the other and it will be seen that diagonally opposed end locator assemblies 80 are identical one with the other. It will be appreciated that a description of one such end locator assembly affords an adequate description of each end locator assembly 80. With particular reference to FIG. 7, the end locator assembly 80 includes generally triangularly shaped base plate 82 having secured thereto as by welding and along its underside a flange of an angle 84. Secured for example by welding along the underside of plate 82 is a flange of another stationary support angle 86. The upstanding flange 88 of angle 84 is provided with a plurality of longitudinally spaced pins 90. A pair of generally inverted U-shaped clamps 92 each having an opening 94 at one end for receiving a pin 90 are provided for securing the end locator assembly 80 to the guide bar, for example guide bar 18. The opposite leg of clamp 92 is provided with a screw 96 and it will be appreciated that clamp 92 can be disposed over guide bar 18 and screw 96 tightened to clamp end locator assembly 80 to guide bar 18. A longitudinally movable support 98 which is comprised of an end plate 100 is mounted for adjustable sliding movement in a longitudinal direction relative to the end locator assembly 80. Particularly, a pair of guide blocks 102 are spaced along the horizontal flange of angle 84 and a shaft 104 is slidably receivable within guide blocks 102, the end of shaft 104 being suitably secured as by welding to end plate 100 of movable support 98. A screw 106 threads into one of guide blocks 102 whereby support 98 is movable longitudinally relative to end locator assembly 80 into selected adjustable positions. For reasons more particularly discussed hereinafter, the end of angle 84 is offset from the end stop afforded by the upright flange 105 of angle 86 whereby, by sliding rod 104 in blocks 102, end plate 100 can be located on either side of or flush with flange 105. Similarly, a support comprised of an angle 108 having an upstanding flange 110 is mounted for movement transversely of end locator assembly 80 to accommodate trusses of various widths. Particularly, support 108 carries a mounting block 112 to which is secured one end of a shaft 114 slidably receivable in a mounting block 116 carried by support 86. A screw 118 permits location of support 108 at selected adjustable positions transversely of locator assembly 80. It will be appreciated that the upstanding flange 110 of support 108 lies in a common transverse plane with the upstanding flange 105 of angle 86.

Figure 9:
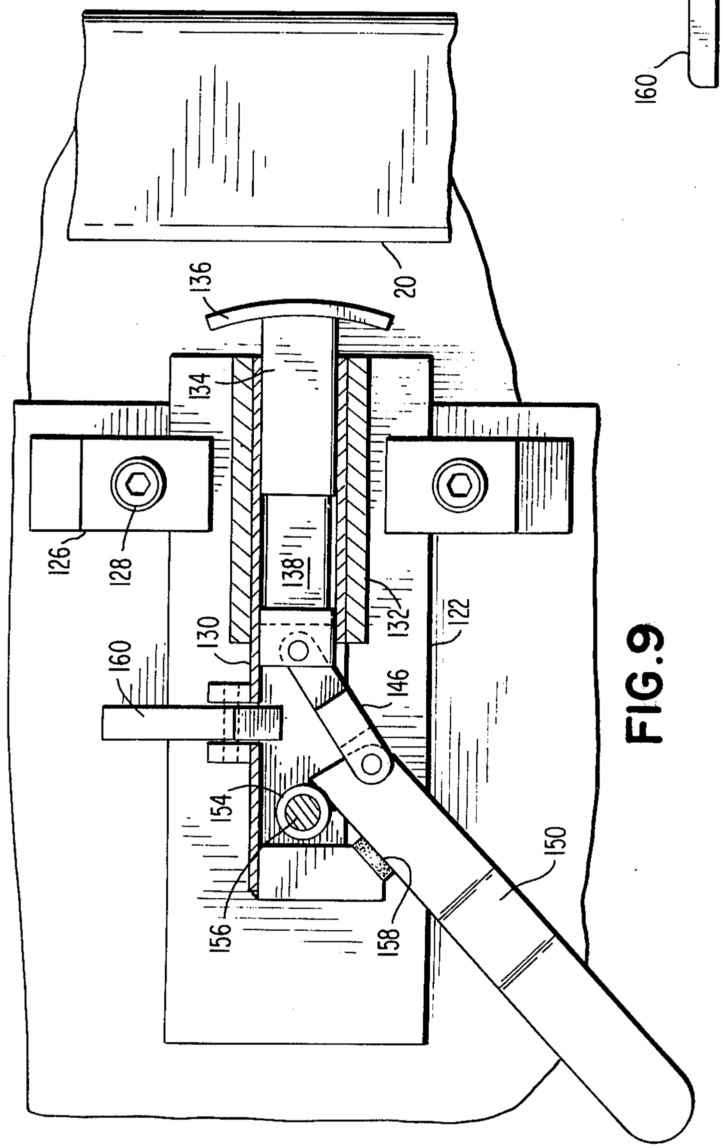
FIG. 9 is a fragmentary enlarged plan view of the clamp assembly illustrating the clamp in its released position.
Figure 10:
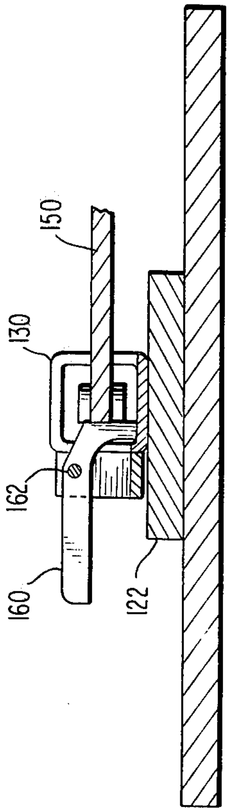
FIG. 10 is a fragmentary cross-sectional view of the clamp assembly taken generally about on line 10—10 in FIG. 7.

Referring again to FIG. 7, there is illustrated a clamp assembly generally designated 120, it being appreciated from a review of FIG. 1 that a plurality of such clamp assemblies 120 are longitudinally spaced along opposite sides of jig pad 12 for the purpose of clamping the outermost guide bars, i.e., guide bars 20 and 24, against the end locator assemblies 80 and also for imparting camber to the lower chord of the truss. Each clamp assembly 120 includes a mounting plate 122 which is secured against transverse movement to the mounting bars 14, by means, not shown. A support plate 124 is releasably clamped to mounting plate 122 by a pair of dogs 126 secured to mounting plate 122 by bolts 128. Plate 124 is slidable toward and away from the outermost chord on the like side of the jig pad as the clamp assembly 120 is secured in such adjusted position by the dogs 126. A square tubular housing 130 is secured between a pair of upright plates 132 mounted on support plate 124. Within housing 130 there is provided a ram assembly including a tube 134 carrying a ram head 136 at one end and secured to a spacer tube 138 at its opposite end. A short tube 142 is secured at the rear end of spacer 138 and carries a pin 144 received through one end of link 146. Link 146 terminates at its opposite end in a clevis 148. One side of housing 130 is open and receives a handle 150, the inside end of which is secured to clevis 148 by pin 152. Handle 150 is secured to a sleeve 154 which is rotatable about a shaft 156 upstanding from the base of housing 130. A stop 158 is provided at the rear of housing 130. It will be appreciated from the foregoing description of the clamp assembly that movement of handle 150 from the position illustrated in FIG. 9 to the position illustrated in FIG. 7 advances the ram assembly forwardly within housing 130 to engage head 136 against the guide bar. Overcenter movement of the toggle link 146 is prevented by abutment of the end of link 146 and the end of handle 150 against a bracket or trigger 160 which is pivoted at 162 to a pair of ears 164 carried on the side of housing 130 remote from handle 150. As illustrated in FIG. 10, movement of the toggle link to a position releasing ram head 136 from clamping engagement with the guide bar may be effected initially by downward movement of bracket 160 to displace the toggle link overcenter to its released position illustrated in FIG. 9.

Referring to FIGS. 13–15, there is illustrated an alignment or web positioner assembly generally designated 170 for use in the present fabrication system in the manner to be described. Positioner assembly 170 includes a pair of generally rectangular shoes 172 each of which is open along one side for receiving a block of wood or lumber for reasons disclosed hereinafter. The shoes are connected one to the other adjacent one end by a pair of brackets 174. Each bracket is secured for example by welding to one of the shoes 172 while the opposite end of the bracket is provided with a slot 176 which receives a pin secured to the other shoe 172. Consequently, shoes 172 are mounted for movement toward and away from one another. The interior face of each shoe is provided with a wedge face 182, the wedge faces 182 being configured to converge toward one another in a direction away from the ends of the shoes connected one to the other by brackets 174. Between the shoes 172 and brackets 174 there is provided a wedge 184 which cooperates with the wedge faces 182 to displace the shoes away from one another upon insertion of wedge 184 between the shoes. Wedge 184 is provided with a pin 186, whereby the wedge 184 is retained between shoes 172 and 174.

Referring now to FIGS. 17, 18 and 19, there is illustrated another form of web positioner assembly generally designated 190 and which form constitutes the preferred positioner for use with the truss fabrication system hereof. Positioner 190 includes a pair of elongated plates 192 and 194 which terminate at their lower ends in downwardly and outwardly inclined legs 196 and 198 respectively. An air cylinder 200 is suitably secured to the upper end of plate 194, for example by a hex nut 202, and its piston rod 204 extends through plate 194 for threaded securement to the upper end of plate 192. A guide rod 206 is threadedly secured at one end to an intermediate portion of plate 192 and is slidably receivable in a bushing 208 secured in an intermediate portion of the other plate 194. A valve 210 is suitably secured by screws not shown to the upper end of plate 194 and air connections, also not shown, are provided with the opposite ends of cylinder 200. Valve 210 is operable by a palm button actuator 212. Accordingly, extension of piston rod 204 moves plate 192 away from plate 194 and retraction of piston rod 204 moves plate 192 toward plate 194, the plates being maintained in alignment by the piston rod 204 and guide rod 206.

Figure 2:
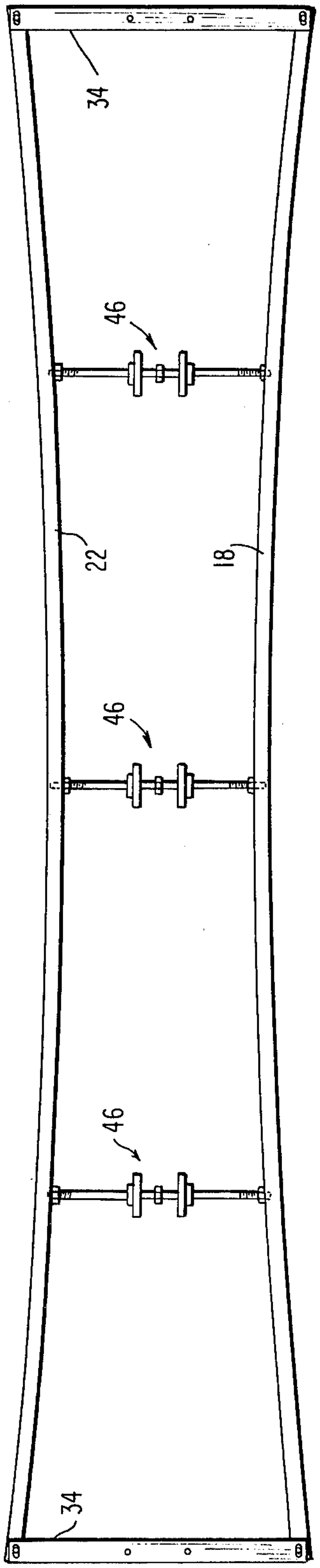
FIG. 2 is an exaggerated schematic illustration of a camber adjustment mechanism for the inner pair of guide bars.

In utilizing the truss fabrication system hereof, the innermost pair of guide bars are first set up to provide the desired camber in the truss. To accomplish this, the camber adjustment assemblies 46 are adjusted to bend guide bars 18 and 22 toward one another to produce the desired camber at each longitudinal location along the jig pad. Particularly, the adjusting nuts 70 on rods 48 of each assembly 46 are rotated whereby the reversely threaded end portions of rods 48 cooperate with guide bars 18 and 22 to draw the latter toward one another. As best illustrated in FIG. 2, the rod of the medial adjustment assembly 46 is rotated to a greater extent than the rods of the adjustment assemblies located between it and the ends of the guide bars to provide maximum camber at the center of the guide bars and accordingly at the center of the truss undergoing fabrication. The other assemblies 46 are adjusted accordingly to provide a smooth camber curve, it being appreciated that the ends of the guide bars are anchored to pad 12 by end bars 34. The precut chords of the truss are then dropped between the guide bars and the end webs and diagonals are inserted between the chords.

Thereafter, the end locator assemblies 80 are longitudinally positioned along the guide bars 18 and 22 in accordance with the length of the desired truss. Particularly, clamps 92 are secured to the innermost pair of guide bars 18 and 22 such that end stops, i.e., flanges 105, are spaced one from the other a distance equal to the length of the truss under fabrication. The clamp assemblies 120 are then transversely positioned by sliding support plates 124 relative to their mounting plates 122. Particularly, the clamp support plates are advanced toward the outermost guide bars and relative to plates 122 selected distances according to the camber desired for the outermost guide bars with the plates 124 being advanced a greater distance from the ends toward the middle of the truss set-up. Thus the heads of the rams 136 engage the outermost guide bars and introduce camber into such guide bars and the lower chords of the truss bearing against the outer guide bars. At the center of the truss, the pair of center webs, which extend normally between the chords, are engaged by a positioner assembly to align the diagonals in their proper positions in the truss. That is, the positioners serve to compress the diagonals on each side of the intermediate webs toward the nearest end stop assembly thus bringing the ends of the diagonals into butting engagement against the chords and adjacent diagonals or webs as applicable. Preferably, the positioner assembly illustrated in FIGS. 17–19 hereof is utilized to provide the foregoing described action. Particularly, the legs 136 and 138 are inserted between the centrally located normally extending webs and along the side of the truss along which the nearest ends of the adjacent diagonals butt the chord. The valve 210 is actuated and cylinder 200 extends piston 204 to separate plates 192 and 194 relative to one another and thereby to compress the diagonals on the opposite sides of the central portion of the truss toward the respective end stop assemblies. Once the diagonals and webs are thus properly positioned, the connector plates are spotted above each joint and the teeth thereof are partially driven into the members forming the joint for example by a hammer blow. In this manner, the position of the chords, webs and diagonals in a truss configuration is set and positioner assembly 190 is withdrawn. The truss is thus ready for final securement of the teeth of the connector plates into the joints. This can be accomplished by displacing the jig pad through a press, for example in the manner disclosed in U.S. Pat. No. 3,602,237 of common assignee herewith or the press may be moved along the jig table for example in the manner disclosed in U.S. Pat. No. 3,602,237 also of common assignee herewith. After the teeth of the connector plates are embedded into the joints on one side of the truss, the clamps are released and the truss is flipped over and again clamped between the guide bars. Additional connector plates are then spotted on the joints on the opposite side of the truss and the press is again utilized to embed the teeth of such additional connector plates into the joints of the truss whereby the trusses are fully fabricated.

Figure 11:
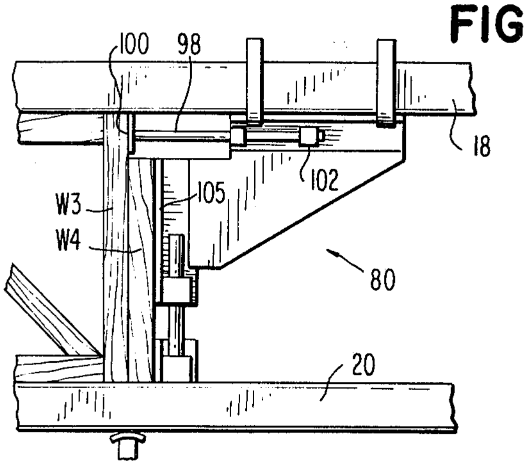
FIGS. 11 and 12 are fragmentary plan views of the end locator or stop assembly and respectively illustrating such stop assembly in position for locating the boards of two different types of trusses.
Figure 11A:
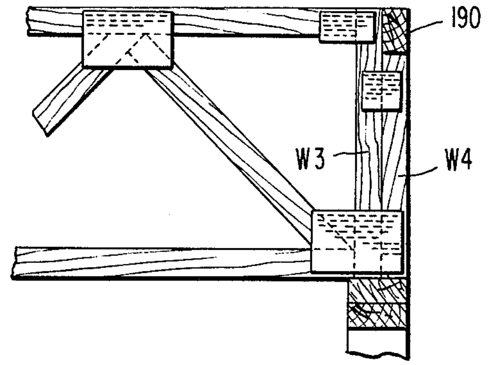
FIGS 11A and 12A are fragmentary side elevational views of the ends of the chords constructed in accordance with the stop assembly set-up of FIGS. 11 and 12.

Referring now to FIGS. 11, 12 and 11A, 12A, the locator assemblies 80 can be adjusted to fabricate trusses wherein the ends of one of chords are inset from or extend outwardly beyond the ends of the other chord. To provide a truss having an inset chord end, the end plate 100 of end locator assembly 80 is displaced inwardly relative to the end stop provided by flange 105, for example as illustrated in FIG. 11. To accomplish this, the screw 106 is loosened and rod 98 is advanced through the guide blocks 102. When end plate 100 is properly located, screw 106 is tightened. A pair of end webs W3 and W4 are provided with web W3 extending normally between and butting the guide bars 18 and 20. Web W4 is shorter in length and butts guide bar 20 at one end, but is spaced from guide bar 18 at its opposite end. The truss fabrication may then proceed as described above to form a truss, for example as illustrated in FIG. 11A having an inset chord. Thus when utilizing the truss thus formed, a rail 190 can be disposed on top of end web W4 to interconnect and facilitate securement of adjacent trusses one to the other. This truss arrangement is commonly known as a bottom chord supported truss.

Figure 12:
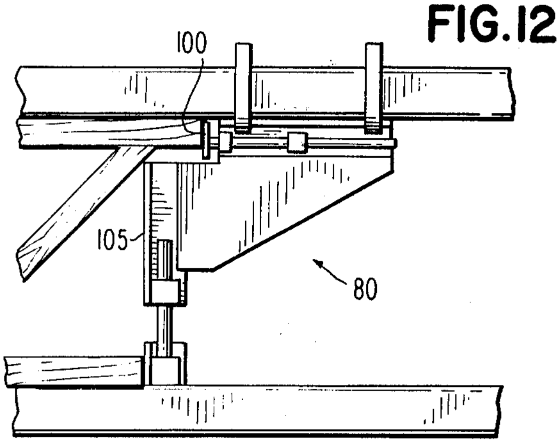
Figure 12A:
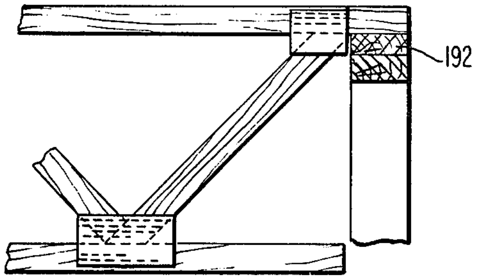

Alternately, a top chord supported truss can be formed, an end portion of which is illustrated in FIG. 12A. To accomplish this, the end plate 100 is spaced back from flange 105 as illustrated in FIG. 12. Consequently the top chord of the truss can be extended beyond the end flange 105 and beyond the end of the opposite chord. Thus, with the end of the upper chord projecting from the adjacent diagonal, the truss may be supported on plates 192 (FIG. 12A) and readily secured thereto.

The foregoing described truss formations are fabricated by applying connector plates to the joints on one side of the truss and thereafter applying the plates to the opposite side of the truss. This requires two pressing operations for each truss fabricated. Preferably, it is desirable that a truss be formed in its entirety for each pressing operation relative to the jig table. To accomplish this, a first truss T1 is initially set up between the guide bars as discussed above and the plates are pressed into one side thereof. The truss is then flipped over and the guide bars are displaced away from one another a width corresponding to the width of two additional chords C2 and C2'. These additional chords are disposed on opposite sides of the partially fabricated first truss T1 and between the chords of the truss and the guide bars 18 and 20 respectively. Connector plates P are then spotted over the joints of the first truss and additional connector plates P1 are located in transverse alignment with the connector plates P overlying the joints of the first partially fabricated truss. The connector plates P and P1 and initially held in position, after the positioner 190 is used to locate the joints, by a hammer blow partially embedding the teeth thereof into the wooden members. The jig assembly and press thus cooperate as previously described to embed the teeth of the connector plates into the underlying wood. Particularly, the plates P overlying the joints between the diagonals and chords and webs as applicable, are embedded therein to complete the fabrication of the formerly partially completed first truss T1. Similarly, the teeth of the connector plates P1 spotted along the outside chords C2 and C2' are embedded into the edges of the chords, it being appreciated that the upper face of the guide bars are spaced below the upper edges of these chords whereby the teeth of the connector plates P1 do not engage the guide bars upon full embedment.

The completely fabricated first truss T1 is then removed from between the guide members and the second pair of outer chords C2 and C2' are flipped over as illustrated from a review of FIG. 21A. An additional pair of chords C3 and C3' for a subsequent truss are positioned between the chords C2 and C2' and the respective guide bars as illustrated in FIG. 21A. The webs and diagonals are then inserted between the innermost pair of chords C2 and C2' and positioner 190 is utilized as previously described to locate the webs and diagonals in butting relation against one another and the chords.

As illustrated in FIG. 21A, the webs and diagonals rest on the upwardly projecting teeth of the connector plates engaged against the jig pad. Thus, the webs and diagonals are offset upwardly a distance equal to the length of the teeth of the connector plates P1. Connector plates P2 are then spotted along the joints of the truss undergoing fabrication. Connector plates P3 are also spotted along the outermost chords C3 and C3' in transverse alignment with plates P2. The plates spotted along the partially completed truss incline upwardly due to the slight upward displacement of the diagonals and webs relative to their chords. However, by initially embedding the teeth of these connector plates as by a hammer blow into the chords, diagonals, and webs, they are maintained in their proper position for pressing. The press and jig assembly again cooperate to fully embed the teeth of the plates into their respective underlying wooden members. In this manner, however, the truss T2 is fully formed as illustrated in FIG. 21B. Upon removal of truss T2, chords C3 and C3' are flipped over and an additional pair of chords C4 and C4' are inserted between chords C3 and C3' and the guide bars respectively. The foregoing described truss forming procedure is then repeated. It will be appreciated that, by using the foregoing described technique, a truss is completely fabricated for each complete cycling of the press and jig assembly.

While the preferred method of forming flat chord trusses in accordance with the present invention is illustrated in FIGS. 20 and 21A–21C, an alternate method of simultaneously embedding the teeth of connector plates into the opposite sides of the truss such that a completely fabricated truss is formed for each pass of the press over the jig assembly or pass of the jig assembly through a press is illustrated in FIG. 16. Particularly, magnetic tape 220 is located and releasably secured to the sheet metal 16 located between the guide bars and the jig pad 12 at the longitudinal locations of the joints of the truss. The tape is cut out or recessed as indicated at 222 in FIG. 16 to conform with the outline of a connector plate. Thus, when the location of the joints of a particular truss is known and a number of like trusses are to be fabricated, the magnetic tape 220 defines the location of the connector plate at each joint location. Accordingly, the connector plates are place placed in the recessed portion 222 of the magnetic tape 220 with their teeth extending upwardly. The chords and webs are placed between the guide bars 18 and 20 and additional plates are located in overlying relation to the joints along the upper side or face of the truss, the additional plates being spotted with their teeth extending toward the truss. The truss is then ready for fabrication and a single pass of the press over the jig assembly or pass of the jig assembly through the press completely fabricates the truss.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A jig assembly for holding wooden members in predetermined positions for forming a truss comprising:

an elongated jig pad, a pair of generally parallel guide bars carried by said pad at spaced locations one from the other and defining abutments substantially coextensive in length with the length of respective upper and lower chords of a truss disposed between said bars, and means carried by said pad at least at one end of the jig assembly and located between said bars forming a stop for the ends of the chords disposed between said bars, said jig assembly being constructed such that the first and second pairs of bars define inner and outer pairs thereof, the first mentioned camber forms means including an element engaging between the inner pair of bars, and means cooperable between said element and said inner pair of bars for displacing said inner pair of bars toward one another and to substantially simultaneously form a camber in said inner pair of guide bars.

2. A jig assembly according to claim 1 wherein said element comprises a screw threadedly engageable at opposite ends with the inner pair of said bars, opposite end portions of said screw being reverse threaded to displace said bars substantially equal distance upon rotation of said screw.

3. A jig assembly for holding wooden members in predetermined positions for forming a truss comprising:

an elongated jig pad, a pair of generally parallel guide bars carried by said pad at spaced locations one from the other and defining abutments substantially coextensive in length with the length of respective upper and lower chords of a truss disposed between said bars, and means carried by said pad at least at one end of the jig assembly and located between said bars forming a stop for the ends of the chords disposed between said bars, said jig assembly including a second pair of generally parallel guide bars carried by said pad at spaced locations one from the other and defining abutments for respective upper and lower chords of a truss disposed between said second pair of bars, said second pair of bars lying generally parallel to the first mentioned pair of bars and defining therewith a pair of inner bars and a pair of outer bars, means interconnecting said pair of inner bars one to the other for moving said inner bars toward and away from one another.

4. A jig assembly according to claim 3 wherein said interconnecting means comprises a screw threadedly engageable at opposite ends with the inner pairs of said bars, opposite end portions of said screw being reverse threaded to displace said bars substantially equal distances upon rotation of said screw.

5. A jig assembly according to claim 3 wherein said interconnecting means includes a plurality of screws threadedly engageable at opposite ends with said inner bars at longitudinally spaced positions along said bars, opposite end portions of said screws being reverse threaded to displace said inner bars substantially equal distances toward or away from one another upon rotation of said screws.

6. A jig assembly according to claim 3 including means for anchoring the ends of said inner bars to said pad, said interconnecting means being located along said inner bars between the opposite ends thereof for flexing the inner bars toward and away from one another.

7. A jig assembly for holding wooden members in predetermined positions and forming a truss having a camber, comprising an elongated jig pad, a pair of generally parallel guide bars carried by said pad at spaced locations one from the other and defining abutments substantially coextensive in length with the length of said upper and lower chords of the truss disposed between said bars, and means carried by said pad for forming a camber in at least one of said bars, said jig assembly including a second pair of generally parallel guide bars carried by said pads at spaced locations one from the other and defining abutments for respective upper and lower chords disposed between said second pair of bars, said second pair of bars lying generally parallel to the first mentioned pair of bars, means for forming a camber in one of the second pair of bars, and means carried by said pad for forming a substantially similar camber in the other bar of said second pair thereof, said jig assembly being so constructed that the first and second pairs of bars define inner and outer pairs thereof, the first mentioned camber forming means including an element engaging between the inner pair of bars, and means cooperable between said element and said inner pair of bars for displacing said inner pair of bars toward one another and to substantially simultaneously form a camber in each guide bar of the inner pair thereof.

* * * * *